2,892,763
PRODUCTION OF PURE ELEMENTAL SILICON

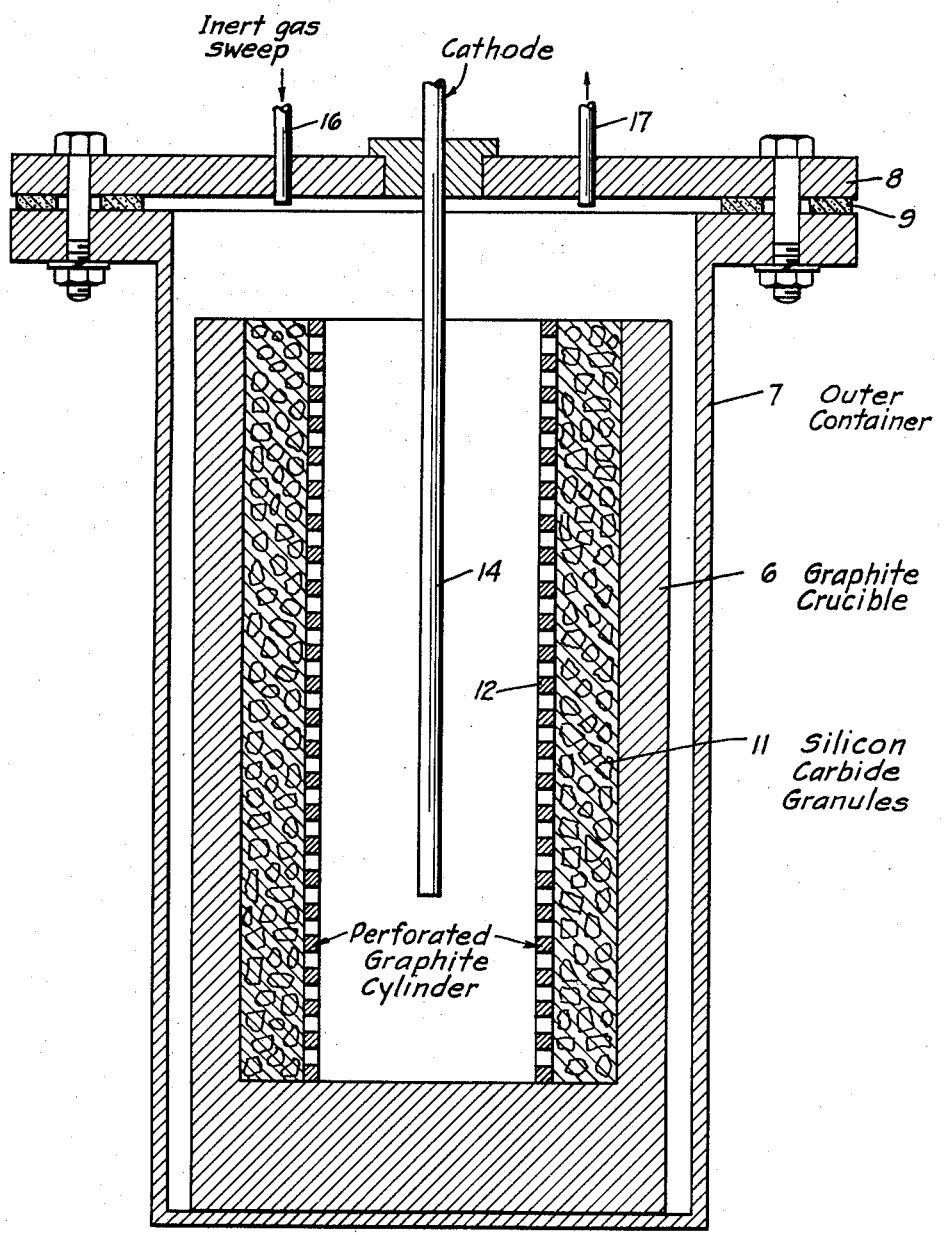

David R. Stern, Fullerton, and Quentin H. McKenna, Los Angeles, Calif., assignors to American Potash & Chemical Corporation, a corporation of Delaware Application April 12, 1957, Serial No. 652,573

7 Claims. (Cl. 204—60)

This invention relates to the production of pure elemental silicon.

The importance of silicon metal in present day industry is manifested by its many and steadily growing number of applications. Silicon has found large usage in the iron and steel industry in the form of ferrosilicon, an iron-silicon alloy which is used for alloying, deoxidizing, and reduction of other metals such as manganese, chromium, tungsten, and molybdenum. In the nonferrous metal industry, silicon is employed as an alloying agent for copper, aluminum, magnesium, nickel and others. Silicon is also used in combination with ceramics to give "cermets," compositions resembling ceramics which are useful in high-temperature applications. Very pure silicon has found new and interesting uses because of its electrical properties in diodes, transistors, power rectifiers and other electronic devices. Thus, it is of equal importance that better and cheaper methods of producing silicon metal be sought.

An objective of this invention is to provide a process for producing substantially pure elemental silicon on a commercial scale. Our invention involves the preparation of elemental silicon from silicon carbide in a fused salt electrolytic system. We have found that if silicon carbide is made an anode and submerged in a fused salt bath containing an alkali chloride or mixture of alkali chlorides and a fluosilicate such as potassium fluosilicate, silicon contained in the silicon carbide structure passes into solution, leaving a skeletal carbon residue. The dissolved silicon is transported by a direct current to the cathode where it is deposited as elemental silicon. The silicon carbide behaves as a consumable anode and as such can be provided in the form of a massive anode such as a sintered silicon carbide electrode or as finely divided silicon carbide powder contained in an anodically charged chamber of an electrolytic cell.

The electrolysis is best performed at a potential which is too low (i.e., less than 3 volts) to reduce electrolytically the fused bath constituents. Thus, while silicon deposits on the cathode, no chlorine or fluorine is discharged at the anode and no appreciable electrolysis of the fluosilicate or alkali chloride is observed. The temperature of operation can be in the range of about 400° to 1000° C., depending on the composition of the fused bath and the related melting point.

It was found that the presence of the double fluoride salt of silicon ($K_2SiF_6$) is essential and is involved in the anodic processes. It appears that the $SiF_6^{-2}$ ion enters into an oxidation-reduction with silicon carbide producing a new ionic species of silicon which is subsequently reduced at the cathode to elemental silicon. The $SiF_6^{-2}$ is regenerated by reoxidation at the anode and is again available for the reaction with SiC. The bath component $K_2SiF_6$ acts as a carrier of the silicon supplied by the SiC and is essentially unchanged by electrolysis. However, we do not wish to be limited by any theory of operation.

An electrolytic cell for use in practicing this invention is shown in the single figure in the drawing. This includes a graphite or carbon crucible 6 placed inside a heat resistant metal cell 7, such as Inconel. Other suitable metals can be employed as a cell container. The outer Inconel pot is fitted with an Inconel lid 8 and an asbestos gasket 9, so that the cell can be sealed and the melt kept under an inert atmosphere during electrolysis by an inert gas sweep through pipes 16. The cell can be externally heated or internally heated by electrical resistance heating in the bath itself.

The silicon carbide (SiC) can be in the form of a sintered massive electrode and attached directly to the positive pole of the direct current source. Silicon carbide can also be used in the form of a powder which is held in a compartment of the graphite crucible which is made anodic by connecting the metal shell to the positive pole of the direct current source. If a SiC powder is employed, it can be packed between the wall of crucible 6 and a perforated carbon or graphite cylinder 12, which acts as a mechanical support for the carbide powder. The cathode 14, which can be iron or mild steel, is suspended vertically through the lid into the melt inside the perforated cylinder. Although the cell arrangement shown here employs silicon carbide granules we do not wish to be limited thereto since both fine powder and massive SiC electrodes can be used. It is obvious to those skilled in the art that an electrolytic cell can be designed so that the residual carbon remaining after a period of electrolysis can be removed and new silicon carbide added.

For the purposes of clearly describing our invention, the following examples using two different types of silicon carbide anodes are set forth by way of illustration.

Example 1

A mixture of reagent grade NaCl and KCl consisting of 61 weight percent KCl and 39 weight percent NaCl was charged into a graphite crucible. The crucible was placed in an Inconel pot and the lid bolted down. The entire assembly was heated externally in a crucible furnace until the salts were molten and then enough potassium fluosilicate ($K_2SiF_6$) was added to give a final $K_2SiF_6$ concentration of 15 weight percent. An argon gas sweep was employed during the melting operation. We have discovered that the purity of the salt is of importance with regard to providing a high purity product.

A steel rod cathode and an anode rod, which was a commercial silicon carbide heating element known as Globar, were immersed and the electrolysis was performed in the temperature range 760°–790° C. at a potential which varied between 2.8 and 3.9 volts. Chlorine gas was not liberated at any time during the experiment. At the completion of the run, the current was turned off and the cathode raised out of the melt and cooled in the argon atmosphere.

After cooling, the silicon deposit, coated with occluded salts, was easily broken away from the steel cathode. The deposit was thoroughly washed with water, then 1:1 hydrochloric acid, and, finally, with boiling concentrated hydrochloric acid. The product was thoroughly rinsed with water, then methyl alcohol and dried at room temperature.

The silicon produced was in the form of small particles held together as spongy appearing aggregates. The following representative analysis is illustrative of the purity of the silicon metal that can be obtained from a commercial grade of silicon carbide.

| Constituent: | Percent |
|---|---|
| Silicon | 92 |
| Undetermined | 8 |

Example II

A mixture of reagent grade NaCl and KCl consisting of 61 weight percent KCl and 39 weight percent NaCl was charged into a graphite crucible which had been packed with a pure grade of silicon carbide (99%) granules between the crucible wall and the perforated graphite retaining cylinder. The charged crucible was placed in an Inconel pot, the lid fastened in place, and the entire assembly set in a furnace and heated to about 800° C. to melt the alkali chlorides under an inert gas (argon) sweep. Postassium fluosilicate ($K_2SiF_6$) was added in an amount that gave a final 20 weight percent concentration of $K_2SiF_6$. The bath temperature was then adjusted to the desired operating temperature. Electrolysis in this case can be performed over the temperature range of about 500° to 1000° C., however, we prefer to operate in the range 700° to 850° C.

A mild steel rod-shaped cathode was introduced to the melt through a port provided in the cell lid and the electrolysis performed under argon gas sweep. The voltage was held between 2 and 3 volts and as silicon deposited on the cathode, no evolution of chlorine occurred at the silicon carbide and graphite anode surface. During the electrolysis, the current flow remained reasonably constant but tended to increase slightly with time. No increase in cell voltage was observed as the cathode deposit increased in size.

At the completion of the electrolysis the current was turned off and the cathode raised out of the bath but kept within the cell to cool in an argon atmosphere. Although in these experiments an argon atmosphere was used to avoid atmospheric oxygen contamination, we have found that the deposits may be removed relatively hot into the air because the electrolyte which coats the silicon deposit acts as a protective coating and prevents undue oxidation. After cooling, the silicon deposit is processed in exactly the same manner as described in the first example.

The silicon produced in this case was in the form of relatively coarse crystals as compared to the silicon obtained from commercial SiC. The following representative spectrographic analyses are illustrative of the purity of the silicon metal that can be obtained from a pure grade of SiC.

| Constituent: | Percent |
| --- | --- |
| Silicon (by diff.) | 99.32 |
| Titanium | 0.022 |
| Copper | 0.0016 |
| Nickel | 0.0014 |
| Calcium | 0.00092 |
| Chromium | 0.0058 |
| Vanadium | 0.018 |
| Aluminum | Trace |
| Iron | 0.15 |
| Magnesium | Trace |
| Boron | 0.48 |

Upon removal of a cathode deposit, a clean cathode may be introduced and the electrolysis cycle repeated a number of times until the available silicon in the silicon carbide source has been reduced to a level at which the current carrying capability of the system is no longer practicable. The carbide residue should then be removed and fresh SiC employed in order to continue the production of silicon. In a large scale operation, the anode residue being mostly carbon containing some silicon, would be used to prepare more SiC feed material.

Although in the example cases a 15 to 20 weight percent $K_2SiF_6$ concentration was used, this may be varied and we do not wish to be limited to the bath composition employed therein. One should, however, have from 3 percent to 50 percent by weight of the fluosilicate present.

If various mixtures of alkali chlorides are employed such as KCl and LiCl, the temperature of operation can range between 400° and 1000° C., but we prefer to practice this invention in the range of about 700° to 850° C.

Other cathode materials can be used in place of steel, for example, copper or stainless steel.

We claim:

1. A process for production of silicon comprising passing a current between a silicon carbide anode and a cathode under a potential of less than about 3 volts through a fused salt bath at a temperature between about 400° C. and about 1000° C. to deposit silicon on the cathode, the bath consisting essentially of an alkali metal chloride and an alkali metal fluosilicate, the fluosilicate providing from about 3% to about 50% of the mixture.

2. A process for production of silicon comprising passing a current between a massive silicon carbide anode connected directly to a source of direct current and a cathode under a potential of less than about 3 volts through a fused salt bath at a temperature between about 400° C. and about 1000° C. to deposit silicon on the cathode, the bath consisting essentially of an alkali metal chloride and an alkali metal fluosilicate, the fluosilicate providing from about 3% to about 50% of the mixture.

3. A process for production of silicon comprising passing a current between a silicon carbide anode and a cathode under a potential of less than about 3 volts through a fused salt bath at a temperature between about 400° C. and about 1000° C. to deposit silicon on the cathode, the bath consisting essentially of an alkali metal chloride and an alkali metal fluosilicate, the fluosilicate providing from about 3% to about 50% of the mixture, the anode comprising powdered silicon carbide.

4. A process for production of silicon comprising passing a current between a silicon carbide anode and a cathode under a potential of less than about 3 volts through a fused salt bath at a temperature between about 400° C. and about 1000° C. to deposit silicon on the cathode, the bath consisting essentially of an alkali chloride and potassium fluosilicate, the fluosilicate providing from about 3% to about 50% of the mixture.

5. A process for production of silicon comprising passing a current between a silicon carbide anode and a cathode under a potential of less than about 3 volts through a fused salt bath at a temperature between about 400° C. and about 1000° C. to deposit silicon on the cathode, the bath consisting essentially of a mixture of alkali chlorides and potassium fluosilicate, the fluosilicate providing from about 3% to about 50% of the mixture.

6. A process for production of silicon comprising passing a current between a silicon carbide anode and a cathode under a potential of less than about 3 volts through a fused salt bath at a temperature between about 400° C. and about 1000° C. to deposit silicon on the cathode, the bath consisting essentially of an alkali chloride and sodium fluosilicate, the fluosilicate providing from about 3% to about 50% of the mixture.

7. A process for production of silicon comprising passing a current between a silicon carbide anode and a cathode under a potential of less than about 3 volts through a fused salt bath at a temperature between about 400° C. and about 1000° C. to deposit silicon on the cathode, the bath consisting essentially of an alkali chloride and lithium fluosilicate, the fluosilicate providing from about 3% to about 50% of the mixture.

References Cited in the file of this patent

UNITED STATES PATENTS

| 2,832,730 | Nies et al. | Apr. 29, 1958 |
| 2,848,396 | Murphy et al. | Aug. 19, 1958 |

FOREIGN PATENTS

| 58,600 | Germany | Aug. 19, 1891 |
| 164,170 | Australia | Apr. 8, 1955 |

OTHER REFERENCES

Gore: "Chemical Society Journal," vol. 48 (1885 abstracts), pages 110 and 111.